US012607037B2

(12) United States Patent
Farag et al.

(10) Patent No.: US 12,607,037 B2
(45) Date of Patent: Apr. 21, 2026

(54) DRILL RESISTANT LOCK CYLINDER AND METHOD OF MANUFACTURING

(71) Applicant: ASSA ABLOY Americas Residential Inc., New Haven, CT (US)

(72) Inventors: Hanna Farag, Jurupa Valley, CA (US); James Lin, Laguna Niguel, CA (US); Mark Bloom, Ladera Ranch, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 245 days.

(21) Appl. No.: 18/551,081

(22) PCT Filed: Mar. 22, 2022

(86) PCT No.: PCT/US2022/021355
§ 371 (c)(1),
(2) Date: Sep. 18, 2023

(87) PCT Pub. No.: WO2022/204154
PCT Pub. Date: Sep. 29, 2022

(65) Prior Publication Data

US 2024/0183191 A1 Jun. 6, 2024

Related U.S. Application Data

(60) Provisional application No. 63/165,517, filed on Mar. 24, 2021.

(51) Int. Cl.
*E05B 15/16* (2006.01)
*B22F 3/10* (2006.01)
(Continued)

(52) U.S. Cl.
CPC ........ *E05B 15/1614* (2013.01); *B22F 3/1025* (2013.01); *B22F 3/225* (2013.01);
(Continued)

(58) Field of Classification Search
CPC .. E05B 15/16; E05B 15/1614; E05B 15/1635; E05B 15/1664; E05B 27/00;
(Continued)

(56) References Cited

U.S. PATENT DOCUMENTS 4,377,940 A * 3/1983 Hucknall ............ E05B 27/0067 70/378
5,079,936 A * 1/1992 Stefanek ............ E05B 27/0057 70/358

(Continued)

FOREIGN PATENT DOCUMENTS

CN 111992722 11/2020
JP 2013-144897 7/2013

OTHER PUBLICATIONS

PCT International Search Report and Written Opinion in International Application PCT/US2022/021355, mailed Jun. 23, 2022, 10 pages.

(Continued)

*Primary Examiner* — Christopher J Boswell
(74) *Attorney, Agent, or Firm* — Merchant & Gould P.C.

(57) ABSTRACT

A method of forming lock cylinder plug using metal injection molding includes injecting a material that has a metal component and a plastic component into a mold. The metal component of the material is at least partially steel. The method includes molding the material into a lock cylinder plug having a key way passage. The method includes debinding the lock cylinder plug and supporting a portion of the lock cylinder plug using at least one ceramic support before increasing the density of the lock cylinder plug by performing a sintering heating process. The method includes inspecting the lock cylinder by inserting a key way portion of a key way gauge into the key way passage of the lock cylinder plug. Inspecting also includes classifying the lock (Continued)

cylinder plug as acceptable, at least in part, if the key way portion of the key way gauge is insertable entirely within the key way passage.

20 Claims, 9 Drawing Sheets

(51) Int. Cl.
*B22F 3/22* (2006.01)
*E05B 27/00* (2006.01)
*E05B 29/00* (2006.01)

(52) U.S. Cl.
CPC ........ *E05B 15/1635* (2013.01); *E05B 27/005* (2013.01); *E05B 29/0026* (2013.01); *B22F 2301/35* (2013.01)

(58) Field of Classification Search
CPC .. E05B 27/001; E05B 27/0046; E05B 27/005; E05B 27/007; E05B 27/0082; E05B 29/0026; E05B 29/004; E05B 29/0066

See application file for complete search history.

(56) References Cited

U.S. PATENT DOCUMENTS

| | | | | |
|---|---|---|---|---|
| 7,836,739 | B2 * | 11/2010 | Huang | E05B 27/005 70/495 |
| 8,408,080 | B2 | 4/2013 | Damikolas | |
| 8,739,587 | B2 * | 6/2014 | Chen | E05B 27/0082 70/495 |
| 8,950,226 | B2 * | 2/2015 | Dolev | E05B 35/003 70/395 |
| 9,567,771 | B2 * | 2/2017 | Dolev | E05B 27/0042 |
| 10,246,902 | B2 * | 4/2019 | Bastianini | E05B 29/0013 |
| 10,612,271 | B2 | 4/2020 | Farag et al. | |
| 11,319,726 | B2 * | 5/2022 | Rufang | E05B 27/005 |
| 2006/0137416 | A1 | 6/2006 | Chang | |
| 2008/0276666 | A1 | 11/2008 | Irwin | |
| 2010/0269602 | A1 | 10/2010 | Damikolas | |
| 2011/0048084 | A1 * | 3/2011 | Tong | E05B 27/0007 70/413 |
| 2012/0210758 | A1 * | 8/2012 | Dolev | E05B 19/04 70/398 |
| 2022/0213716 | A1 | 7/2022 | Farag | |
| 2022/0316238 | A1 * | 10/2022 | Rufang | E05B 27/0082 |

OTHER PUBLICATIONS

PCT International Preliminary Report on Patentability in International Application PCT/US2022/021355, mailed Oct. 5, 2023, 8 pages.

* cited by examiner

DRILL RESISTANT LOCK CYLINDER AND METHOD OF MANUFACTURING

CROSS-REFERENCE TO RELATED APPLICATIONS

This application is a National Stage Application of PCT/US2022/021355, filed on Mar. 22, 2022, as a PCT International Patent Application and which claims priority to and the benefit of U.S. Provisional Patent Application No. 63/165,517, filed Mar. 24, 2021, the disclosure entire disclosures of which is hereby are incorporated herein by reference in its entirety their entireties. To the extent appropriate, a claim of priority is made to each of the above disclosed applications.

BACKGROUND

Lock cylinders, specifically lock cylinder plugs, can include complicated geometry thereby making manufacturing such plugs from easily machined or die cast material common. Lock cylinders that can be rekeyed without removal of the cylinder plug are known to include particularly intricate cylinder plug geometry that includes tight tolerances. Lock cylinders that can be rekeyed without removal of the cylinder plug are highly beneficial to consumers because the locks can be easily rekeyed without calling a locksmith. To allow increased variation in the bitting of keys, sizes, and tolerances of engaging components within the lock cylinder can be intricate.

Die cast lock cylinder plugs from zinc are known; however, such material is susceptible to corrosion and easily drilled. Therefore, zinc requires modification of the lock cylinder plugs to account for this vulnerability. Such modifications include positioning hardened steel inserts in critical areas of the lock cylinder plug. However, to place the hardened steel inserts within the lock cylinder plug, pockets must be created in the zinc plug, thereby compromising the integrity of the lock cylinder plug. Further, due to its susceptibility to corrosion, the lock cylinder plug must undergo a conversion plating process for corrosion protection.

Machined lock cylinder plugs from brass are known; however, such material is easily drilled and expensive. Modifications must be made to the brass cylinder plugs that include compromising integrity of the lock cylinder plug by creating pockets and positioning hardened steel inserts within the pockets, like the die cast zinc plug. Further, machining brass cylinder plugs is both time extensive and expensive.

Therefore, there is a need for improvements in lock cylinder plug material and manufacturing techniques.

SUMMARY

This disclosure relates generally to a method of manufacturing a lock cylinder plug body for a lock cylinder. According to one aspect of the present disclosure, a plug body for a lock cylinder is formed via a metal injection molding (MIM) process.

In one aspect of the present disclosure, a method of manufacturing a lock cylinder plug is disclosed. The method includes injecting a material that has a metal component and a plastic component into a mold. The metal component of the material is at least partially steel. The method includes molding the material into a lock cylinder plug by way of the mold. The lock cylinder plug includes a keyway passage. The method includes debinding the lock cylinder plug by removing the plastic component from the material forming the lock cylinder plug. The method includes supporting a portion of the lock cylinder plug using at least one ceramic support before increasing the density of the lock cylinder plug by performing a sintering heating process to the lock cylinder plug. The method includes inspecting the lock cylinder plug using a keyway gauge. Inspecting includes inserting a keyway portion of the keyway gauge into the keyway passage of the lock cylinder plug. Inspecting also includes classifying the lock cylinder plug as acceptable, at least in part, according to whether the keyway portion of the keyway gauge is insertable entirely within the keyway passage of the lock cylinder plug.

In another aspect of the present disclosure, a lock cylinder plug is disclosed. The lock cylinder includes a main body that extends between a front face and a rear portion and a keyway disposed in the front face. The lock cylinder includes a plurality of key follower recesses defined in the main body and aligned between the front face and the rear portion. The lock cylinder plug is formed by injecting a material into a mold where the material has a metal component and a plastic component. The metal component is at least partially steel. The lock cylinder plug is formed by molding the material into the lock cylinder plug by way of the mold. The lock cylinder plug has a keyway passage. The lock cylinder plug is formed by debinding the lock cylinder plug by removing the plastic component from the material forming the lock cylinder plug. The lock cylinder plug is formed by supporting a portion of the lock cylinder plug using at least one ceramic support before increasing the density of the lock cylinder plug by performing a sintering heating process to the lock cylinder plug. The lock cylinder plug is formed by inspecting the lock cylinder plug using a keyway gauge. Inspecting includes inserting a keyway portion of the keyway gauge into the keyway passage of the lock cylinder plug. Inspecting also includes classifying the lock cylinder plug as acceptable, at least in part, according to whether the keyway portion of the keyway gauge is insertable entirely within the keyway passage of the lock cylinder plug.

In another aspect of the present disclosure, a lock cylinder plug is disclosed. The lock cylinder includes a main body that extends between a front face and a rear portion. The main body having a longitudinal axis extending between the front face and the rear portion. The lock cylinder includes a keyway disposed in the front face and a plurality of key follower recesses defined in the main body aligned between the front face and the rear portion. A central axis of each of the plurality of key follower recesses is transverse to the longitudinal axis of the main body. The main body, the front face, and the rear portion are resistant to drilling and formed from a material having a hardness greater than 20 HRC.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
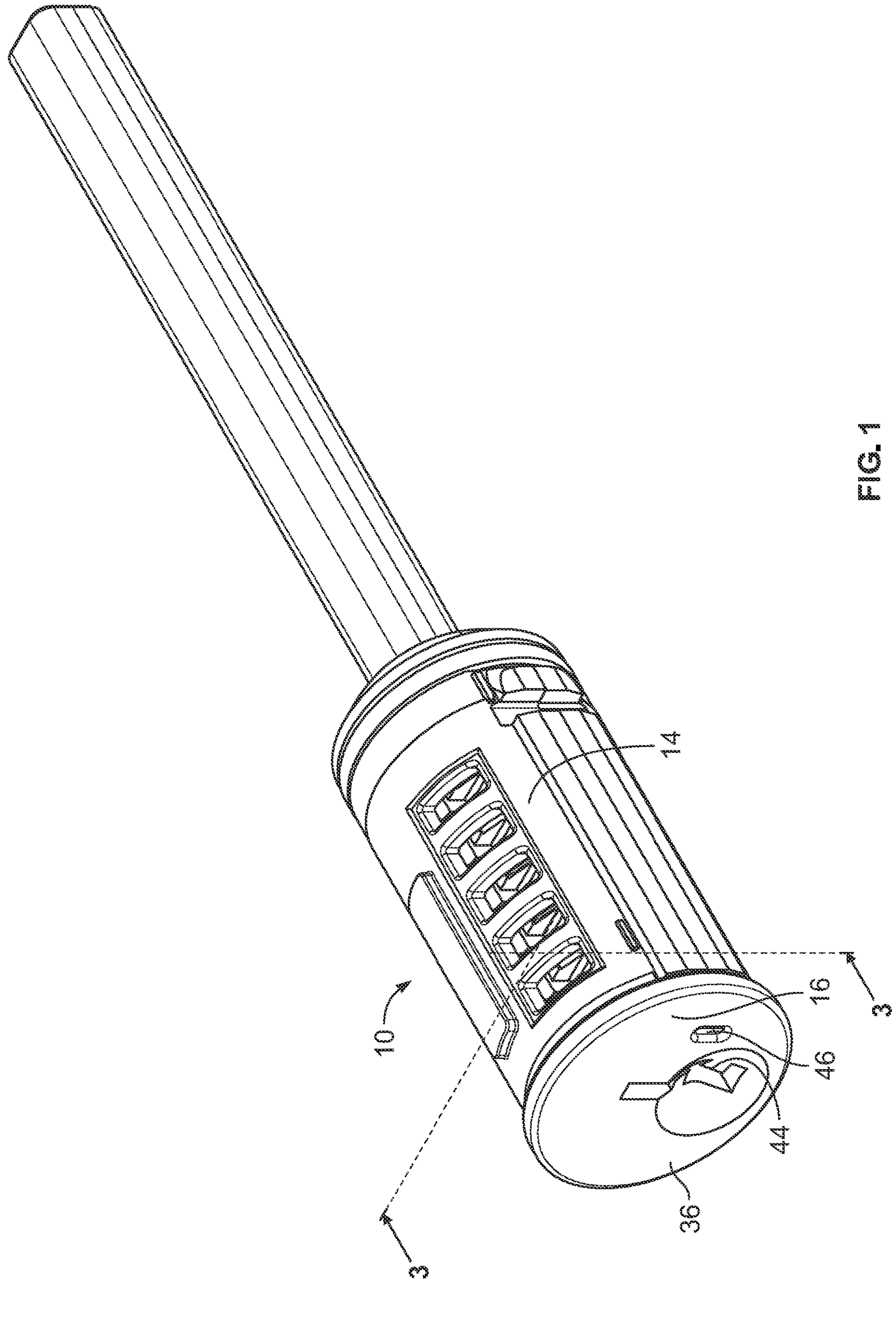
FIG. 1 is a perspective view of an example lock cylinder according to an embodiment of this disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

A rekeyable lock cylinder is disclosed herein that can be rekeyed without removal of the cylinder plug. The operation for rekeying the lock cylinder is similar to that described in U.S. Pat. No. 10,612,271, which is hereby incorporated by reference in its entirety. Examples of a rekeyable lock cylinder are described in U.S. Provisional Patent Application No. 63/165,456, filed Mar. 24, 2021, entitled "REKEYABLE LOCK WITH SMALL INCREMENTS", the disclosure of which is hereby incorporated by reference in its entirety.

The lock cylinder, and specifically the lock cylinder plug body, and method of manufacturing the same, described herein has a plurality of advantages. By manufacturing the lock cylinder plug body from a drill resistant material, such as stainless steel, the lock cylinder plug body is more resistant to attack aimed to compromise the lock cylinder plug, specifically by drilling. Further, by performing unique steps in the manufacturing process, the lock cylinder plug body can be manufactured from a drill resistant material using a metal injection molding (MIM) process.

Figure 2:
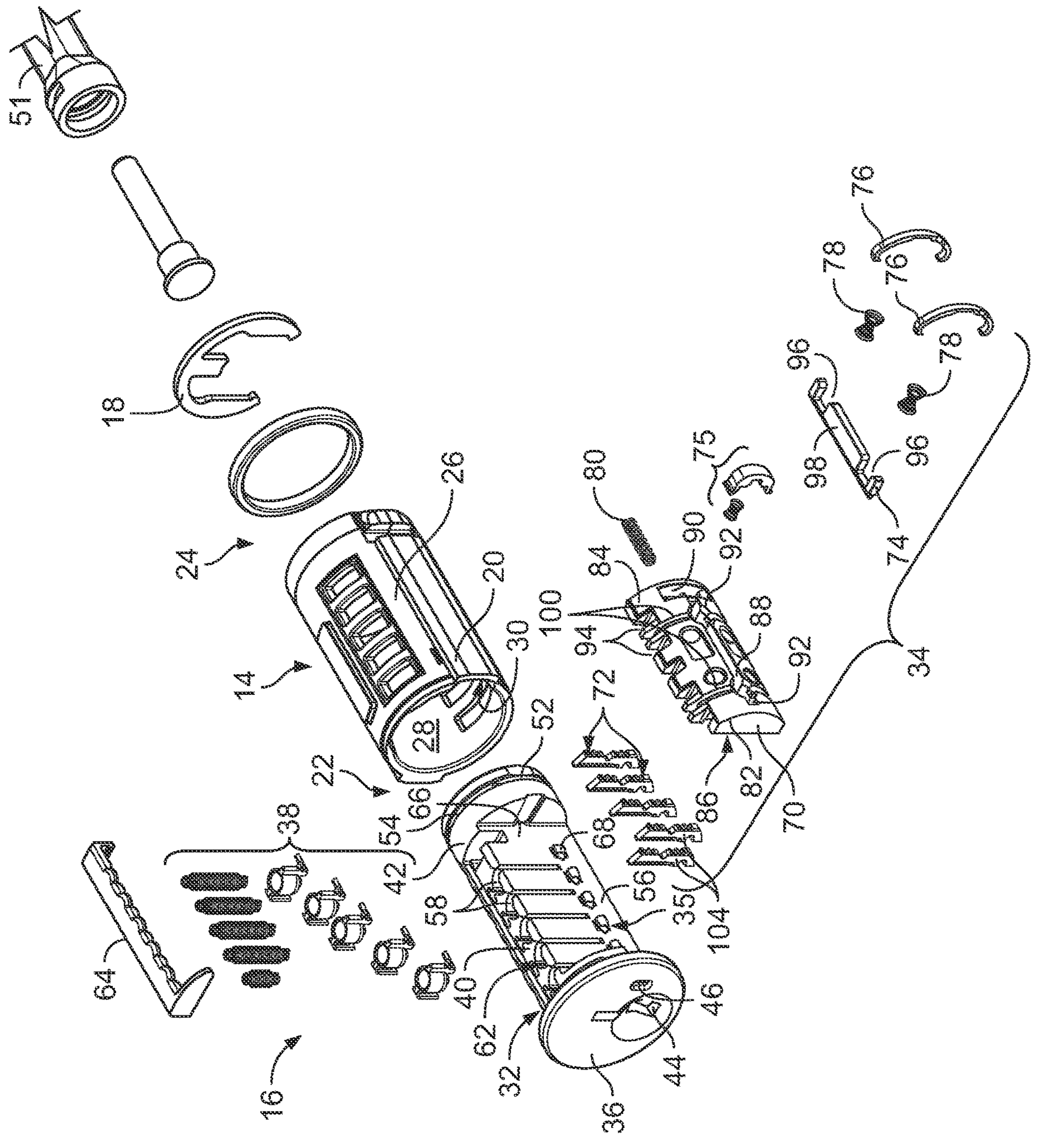
FIG. 2 is an exploded view of the example lock cylinder shown in FIG. 1.
Figure 3:
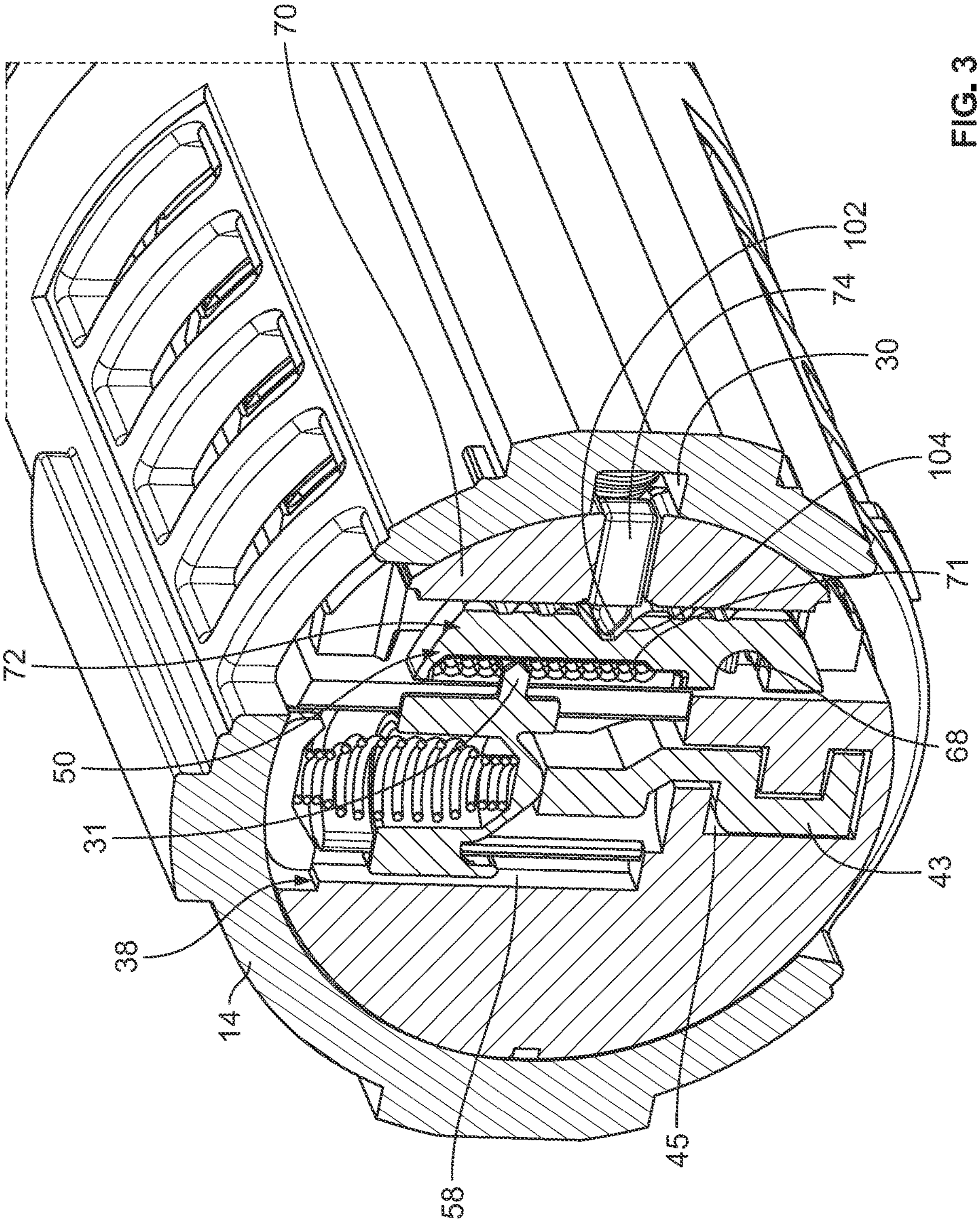
FIG. 3 is a perspective cross-sectional view along line 3-3 of FIG. 1 showing, among other things, the key followers engaged with the racks.

An illustrative lock cylinder 10, according to one example of the present disclosure, is illustrated in FIGS. 1 and 2. A cross section along line 3-3 in FIG. 1 of the lock cylinder 10 is shown in FIG. 3. In some examples, the lock cylinder 10 includes components formed by the MIM process disclosed herein.

The lock cylinder 10 includes a cylinder body 14 and a plug assembly 16. A retainer clip 18 (FIG. 2) couples together the cylinder 14 with the plug assembly 16.

The cylinder 14, as best seen in FIG. 2, illustratively includes a generally cylindrical body 20 having a front end 22, a back end 24, and a cylinder wall 26 defining an interior surface 28. The cylinder wall 26 includes an interior, a locking bar engaging groove 30 (best seen in FIG. 3). In some examples, the locking bar engaging groove 30 has a generally rectangular-shaped cross-section and extends longitudinally along a portion of the cylinder 14, typically from the front end 22.

The plug assembly 16 includes a lock cylinder plug body 32, a carrier subassembly 34, and a plurality of key followers 38 (also known as pins). The lock cylinder plug body 32 illustratively includes a plug face 36, a main body 40, and a rear portion 42. The plug face 36 defines a keyway opening 44 that provides access to a keyway passage 45 for a key 43. The plug face 36 also includes a rekeying tool opening 46. In some examples, the plug face 36 further defines a pair of channels extending radially outwardly for receiving anti-drilling ball bearings. The rear portion 42 is configured to drive a torque blade 51, which could be coupled with a latch assembly (not shown). The rear portion 42 further includes a pair of slots 52 formed in its perimeter and a central groove 54 for receiving the retainer clip 18 to retain the lock cylinder plug body 32 in the cylinder 14.

The main body 40 includes a main portion 56 formed as a cylinder section and having key follower recesses 58 for receiving the key followers 38. The recesses 58 illustratively extend transversely to the longitudinal axis of the lock cylinder plug body 32. While each is shown to have a circular cross section, the recesses 58 can have a variety of different polygonal shaped cross sections, such as each recess having a rectangular cross section. A retaining cap 64 is received in a recess 62 to trap the key followers 38 inside the lock cylinder plug body 32. The recesses 58 extend partially through the lock cylinder plug body 32, with the sidewalls of the channels open to a planar surface 66. The planar surface 66 illustratively includes a plurality of rack-engaging features 68 that block rekeying of the lock cylinder 10 if racks 72 are not aligned to unlock the lock cylinder 10 (e.g., if a valid key is not inserted into the lock cylinder 10).

The carrier subassembly 34 is positioned within a carrier recess 35 of the lock cylinder plug body 32. The carrier subassembly 34 includes a carrier 70, a plurality of racks 72, a spring catch 75, a locking bar 74, a pair of clips 76 for holding corresponding biasing members 78 against the locking bar 74 to urge the locking bar 74 against the racks 72, and a return spring 80. The carrier 70 includes a body 82 in the form of a cylinder section that is complementary to the main portion 56 of the lock cylinder plug body 32, such that the carrier 70 and the main portion 56 combine to form a cylinder that fits inside the cylinder 14. The carrier 70 includes a curved surface 84 and a flat surface 86. The curved surface 84 includes a locking bar slot 88, a spring catch recess 90, and a pair of clip receiving recesses 100 for receiving the clips 76. The locking bar slot 88 illustratively includes a pair of biasing member-receiving bores 92 for receiving the biasing members 78. In the embodiment shown, the locking bar 74 includes a corresponding pair of recessed areas 96 for receiving the biasing members 78. The flat surface 86 of the carrier 70 includes a plurality of parallel rack-receiving slots 94 extending perpendicular to a longitudinal axis of the carrier 70.

The spring-loaded locking bar 74 is sized and configured to fit in the locking bar slot 88 in the carrier 70. The locking bar 74 illustratively includes a blocking portion 98 that is received in the locking bar engaging groove 30 in the cylinder 14 when in a locked position (not shown) and extends out of the locking bar engaging groove 30 when in an unlocked position (FIG. 3). Opposite the squared-off edge of the blocking portion 98, the locking bar 74 includes a flange 102 configured to engage locking bar-engaging grooves 104 formed in the racks 72 (FIG. 3). In the depicted examples, the flange 102 is generally triangular shaped and sized so that when the locking bar 74 is in the unlocked position, the flange 102 is positioned entirely within the locking bar-engaging grooves 104 of the racks 72. As such, in some examples, the locking bar-engaging grooves 104 of the racks 72 are larger than the flange 102. Biasing members 78 urge the blocking portion 98 out of the groove 30 in the cylinder 14 toward the racks 72.

A pin-rack engagement feature 50 provides strong engagement between the key followers 38 and the rack 72 while allowing a plurality of bitting positions. The pin-rack engagement feature 50 includes a rack engagement feature of the key follower 38 that is configured to engage with a key follower engagement feature of the rack 72. In the depicted example, the rack engagement feature is a post 31 and the key follower engagement feature is a slot 71. Complementary engagement surfaces of the post 31 and slot 71 engage with one another to block movement of the key followers relative to the racks 72. In some examples, the slot 71 provides engagement support around the post 31, specifically on opposing sides of the post 31.

Reducing size allows the lock to distinguish between additional bitting positions to increase the number of possible bitting sequences or patterns on keys used in the lock cylinder 10. The term "bitting position" is intended to mean a depth of a key cut in a bitting sequence of a key. The "bitting position" is typically identified by a digit or letter that indicates a depth of a key cut. The number of bitting positions (i.e., depths of key cuts) that can be recognized by lock cylinders differ. In some examples, the lock cylinder 10 can recognize six different bitting positions. In some examples, the lock cylinder 10 can recognize seven or more bitting positions.

Figure 4:
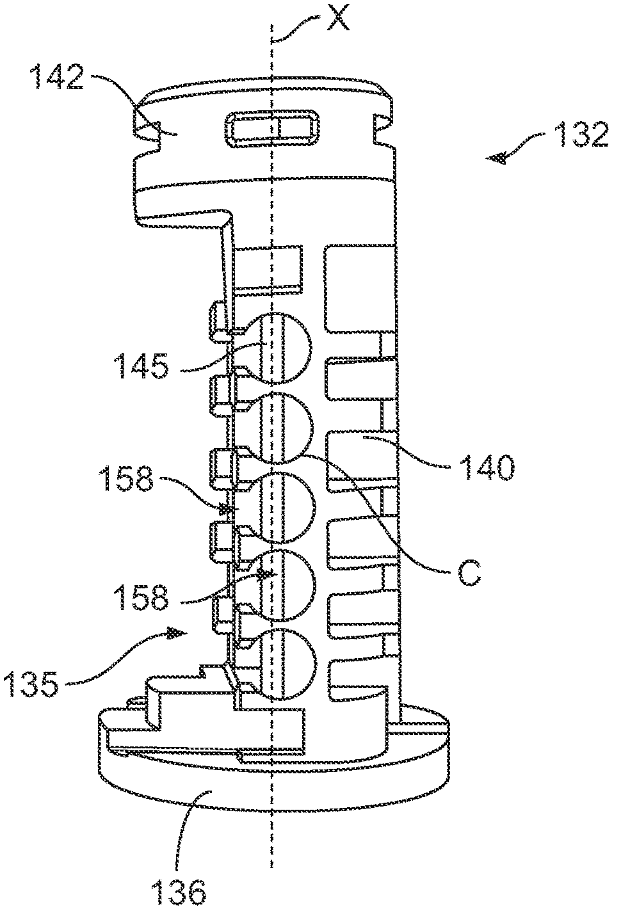
FIG. 4 is a perspective top view of an example lock cylinder plug body according to an embodiment of this disclosure.
Figure 5:
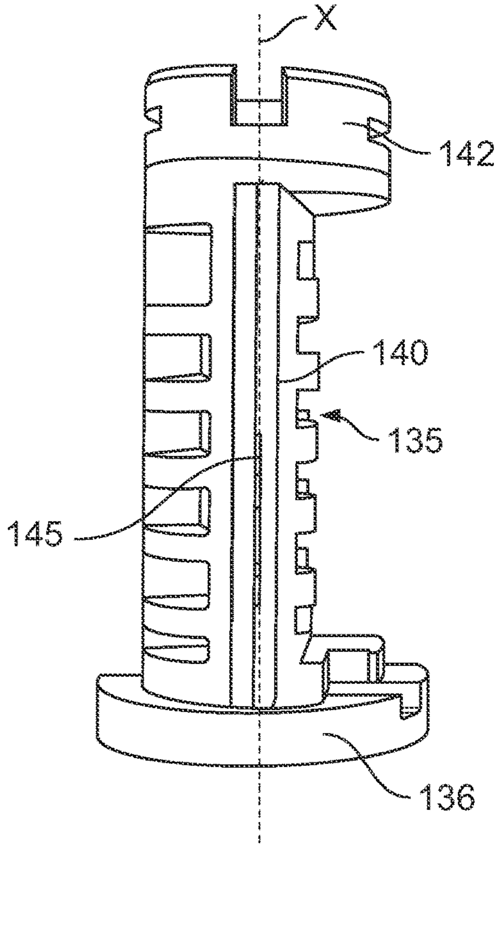
FIG. 5 is a perspective bottom view of the lock cylinder plug body shown in FIG. 4.

FIGS. 4 and 5 show top and bottom views of an example plug body 132, substantially similar to plug body 32 described above. The plug body 132 includes a front face 136, a main body 140, and a rear portion 142. While not shown, the front face 136, like plug face 36, can define a keyway opening that provides access to a keyway passage 145 and also a rekeying tool opening. The rear portion 142 is configured to drive a torque blade, which could be coupled with a latch assembly. The rear portion 142 can also further include a pair of slots for receiving a retainer clip to retain the plug body 132 in a cylinder body of a lock cylinder. In some examples, the plug body 132 is non-symmetrical.

The main body 140 of the plug body 132 includes a plurality of key follower recesses 158 for receiving the key followers 38 aligned longitudinally in the main body 140. The recesses 158 each include a central axis C that extends transversely to a longitudinal axis X of the plug body 132. While each is shown to have a circular cross section, the recesses 158 can have a variety of different polygonal shaped cross sections, for example, each recess 158 can have a rectangular cross section.

The main body 140 of the plug body 132 also includes a carrier recess 135 for positioning a carrier subassembly, similar to carrier subassembly 34 described above, therein. The carrier recess 135 is axially adjacent the plurality of key follower recesses 158 and sized and shaped to receive a carrier subassembly therein. In some examples, the carrier subassembly received in the carrier recess 135 is movable within, and relative to, the carrier recess 135.

Figure 6:
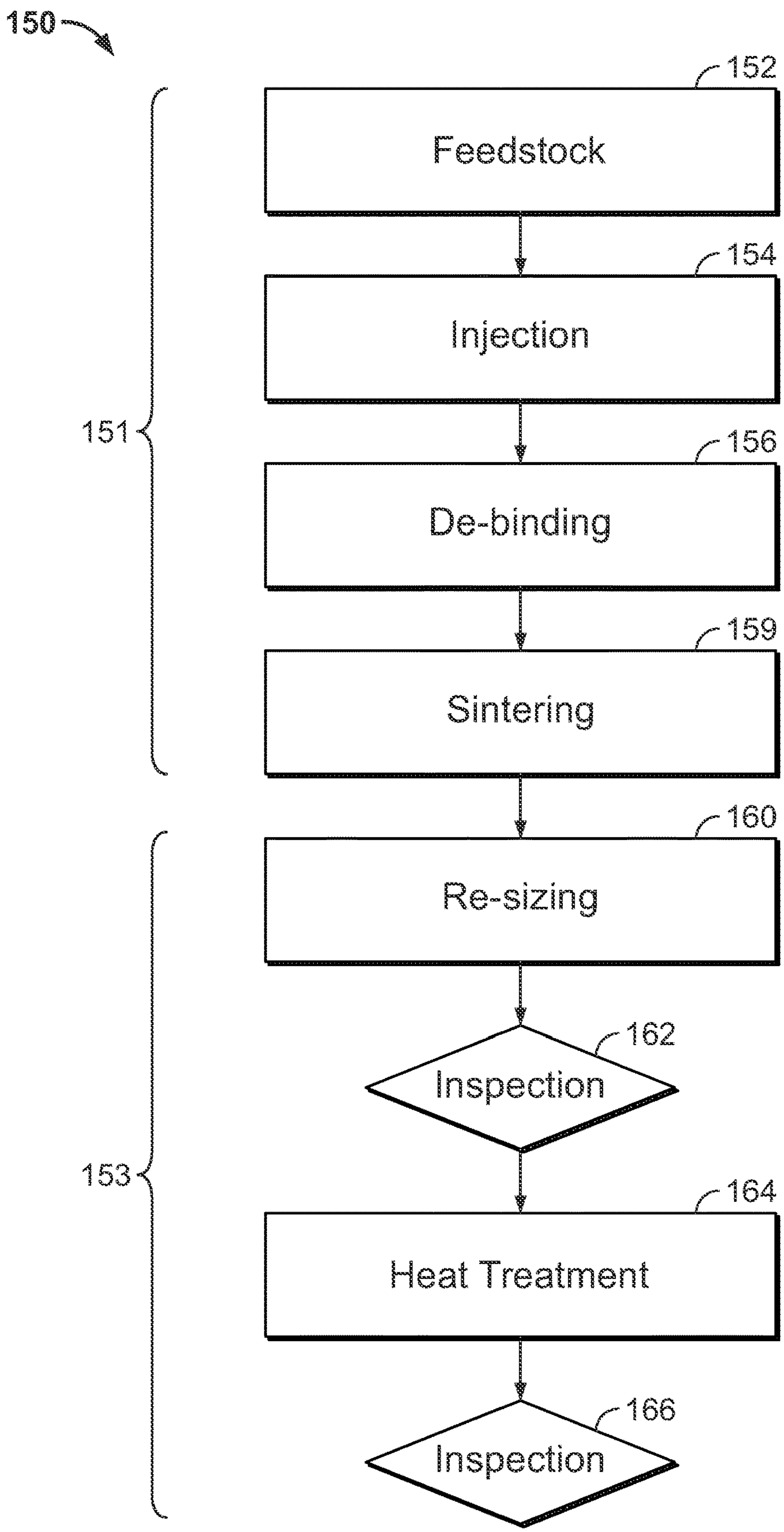
FIG. 6 is a flow chart showing a process of manufacturing the plug body of FIG. 4, according to an embodiment of this disclosure.

FIG. 6 shows a flow chart of a process 150 of manufacturing a plug body. The process 150 is shown to include a set of primary operations 151 and a set of secondary operations 153. The primary operations 151 include providing a feedstock step 152, an injection step 154, a debinding step 156, and a sintering step 159. The secondary operations 153 include a resizing step 160, a first inspection step 162, a heat treatment step 164, and a second inspection step 166.

The process 150 is a MIM process that is configured to create a plug body, for example, the plug body 132, from a drill resistant material. In some examples, the plug body 132 created by the process is constructed of steel. In some examples, the plug body 132 created by the process 150 is stainless steel. In some examples, the plug body 132 created by the process 150 is steel that is more corrosion resistant than low and high carbon steel. In some examples, the steel can be of an alloy and contain a corrosion resistance metal. In some examples, the steel alloy can include nickel. In some examples, the steel alloy can include chrome. In some examples, the plug body 132 created by the process 150 is formed from a material that has a hardness greater than 20 HRC. In some examples, the plug body 132 created by the process 150 is formed from a material that has a hardness between 25 HRC and 60 HRC. In some examples, the plug body 132 created by the process 150 is formed from a material that has a hardness between 25 HRC and 60 HRC. In some examples, the plug body 132 created by the process 150 is formed from a material that has a hardness between 25 HRC and 36 HRC. In some examples, the plug body 132 created by the process 150 is formed from a material that has a hardness between 36 HRC and 42 HRC. In some examples, the plug body 132 created by the process 150 is formed from a material having a hardness of 32 HRC.

At the providing a feedstock step 152, the feedstock used to form the plug body in the process is created. In some examples, a metal agent (e.g., a metal powder) is mixed with a binding agent to form the feedstock. The metal powder and binding agent are heated as they are mixed. In some examples, the metal powder is 17-4PH stainless steel. In some examples, the heated mixed metal powder and binding agent is formed into pellets after it has been cooled.

At the injection step 154, the feedstock is first heated to a flowable material and then injected into a mold in the form of a plug body. The material in the mold is cooled and a formed plug body is ejected. As such, the injected plug body is formed of the feedstock that contains both the metal agent and the binding agent. After being heated and cooled during the injection process, the feedstock cools as solid material.

At the debinding step 156, the binding agent in the feedstock that forms the injected plug body is removed, the process of which is referred to as debinding. Debinding can be done using a variety of different methods, such as by heating the injected plug body to a temperature where the binding agent is burnt off, but the metal agent is not substantially affected. In other examples, debinding can be performed by subjecting the injected plug body to a chemical agent that dissolves the binding agent but does not substantially affect the metal agent.

At the sintering step 159, the injected plug body, sans the binding agent, is exposed to a furnace for a sintering heating process. In some examples, the sintering heat has a temperature that is between 75-90 percent of the melting temperature of the metal agent. In some examples, the sintering heat has a temperature that is 85 percent of the melting temperature of the metal agent. As the heat is increased to the sintering heat temperature, pores in the feedstock are removed and the metal agent becomes fused. During the sintering step 159, as pores are removed from the plug body 132, the plug body 132 increases in density and shrinks. In some examples, the sintering step 159 causes the plug body to increase to 99 percent density. Such a change in density can cause portions of the injected plug body to change, such as by warping. In some examples, portions of the injected plug body that include relatively thin geometries are particularly prone to warping.

Figure 7:
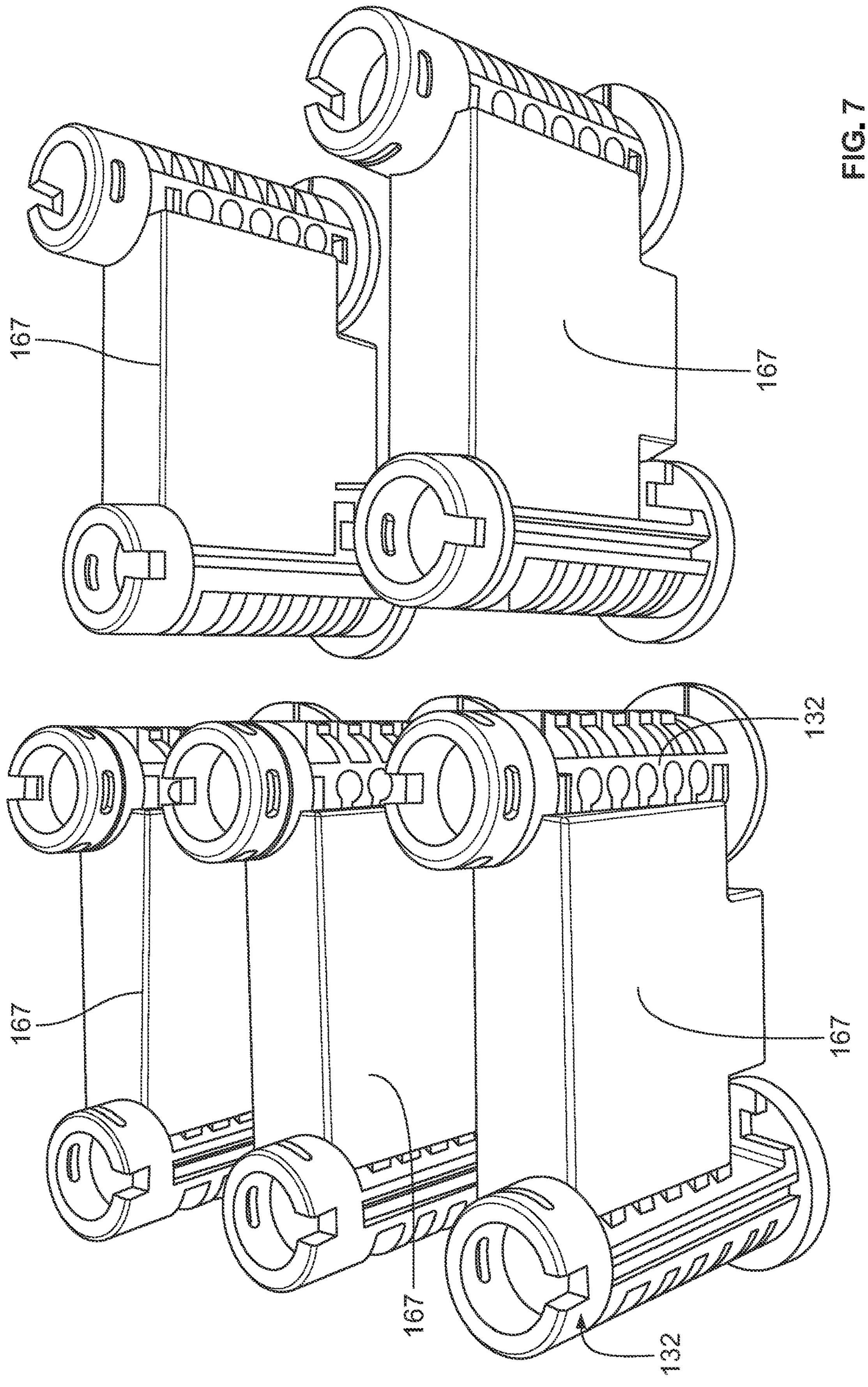
FIG. 7 is a perspective view of a plurality of lock cylinder plugs of FIG. 4 being supported by supports.

To reduce warping of the injected plug bodies during the sintering step 159, a support 167 is used. FIG. 7 shows a perspective view of a plurality of plug bodies 132. Each pair of plug bodies 132 is shown separated by a support 167 positioned within the carrier recess 135 of each plug body 132. In some examples, the support 167 is formed from a ceramic material.

Figure 8:
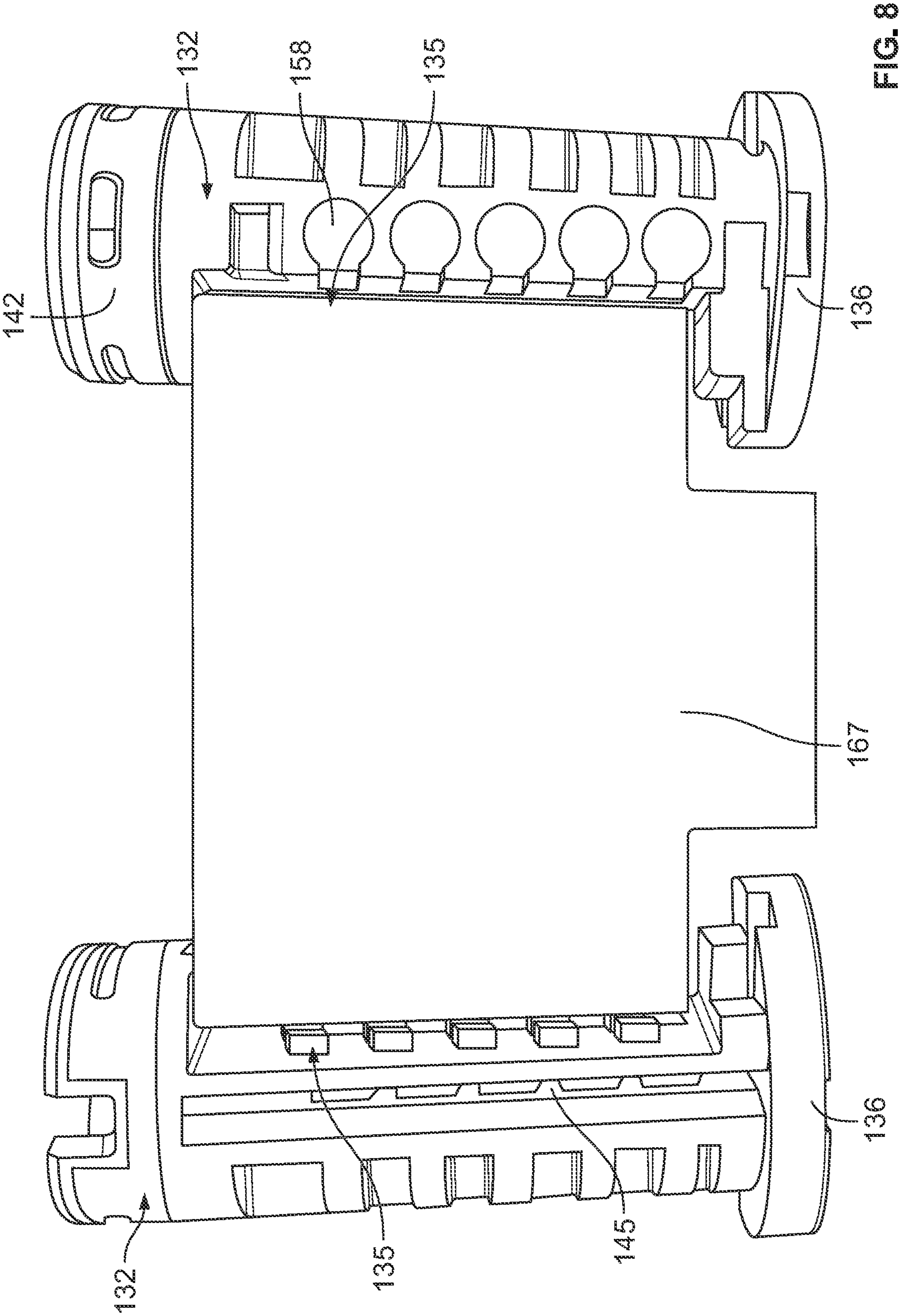
FIG. 8 is a perspective view of a pair of lock cylinder plugs of FIG. 4 being supported by the support of FIG. 7.

As shown in FIG. 8, the support 167 is configured to be positioned within the carrier recess 135 and reduce warping of the plug body 132. In some examples, the support 167 supports the rear portion 142 of the plug body 132 as the plug body 132 is positioned on the front face 136. In some examples, the support 167 supports the front face 136 as the plug body 132 is positioned on the front face 136.

After the sintering step 159, the primary operations 151 are completed. In the secondary operations, the plug body 132 is further refined. In some examples, only a subset of the secondary operations 153 are required to finalize the plug body 132.

After the sintering step 159, a resizing step 160 can be performed. As mentioned above, during the sintering step 159, the plug body 132 can experience warping and distortions. At the resizing step 160, portions of the plug body 132 can be can pressed into shape using machinery to remedy slight distortions. In some examples, the resizing step 160 can be referred to as coining.

The inspection step 162 can be performed after the sintering step 159, and after the resizing step 160. Because the sintering step 159 can cause the plug body 132 to warp and distort, an inspection step 162 can be performed to determine if the plug body 132 is acceptable.

The heat treatment step 164 can be performed after sintering step 159, regardless of whether the inspection step 162 is performed. The heat treatment step 164 increases the overall hardness of the plug body 132 via applying a heat treatment to the plug body. Depending on the composition of the feedstock used, specifically the metal agent, and the desired finished hardness of the plug body 132, the heat applied to the plug body during the heat treatment step can vary. In some examples, a heat treatment is used that subjects the plug body 132 to a temperature between 500 degrees C. and 700 degrees C. In some examples, a heat treatment is used that subjects the plug body 132 to a temperature between 550 degrees C. and 600 degrees C. In further examples still, a heat treatment is used that subjects the plug body 132 to a temperature between 560 degrees C. and 580 degrees C. It is considered within the scope of the present disclosure that, depending on the material used, the heat treatment can use a variety of different temperatures.

The inspection step 166 can be performed after the heat treatment step 164. In some examples, at least some portions of the inspection step 166 are performed prior to the heat treatment step 164.

Figure 9:
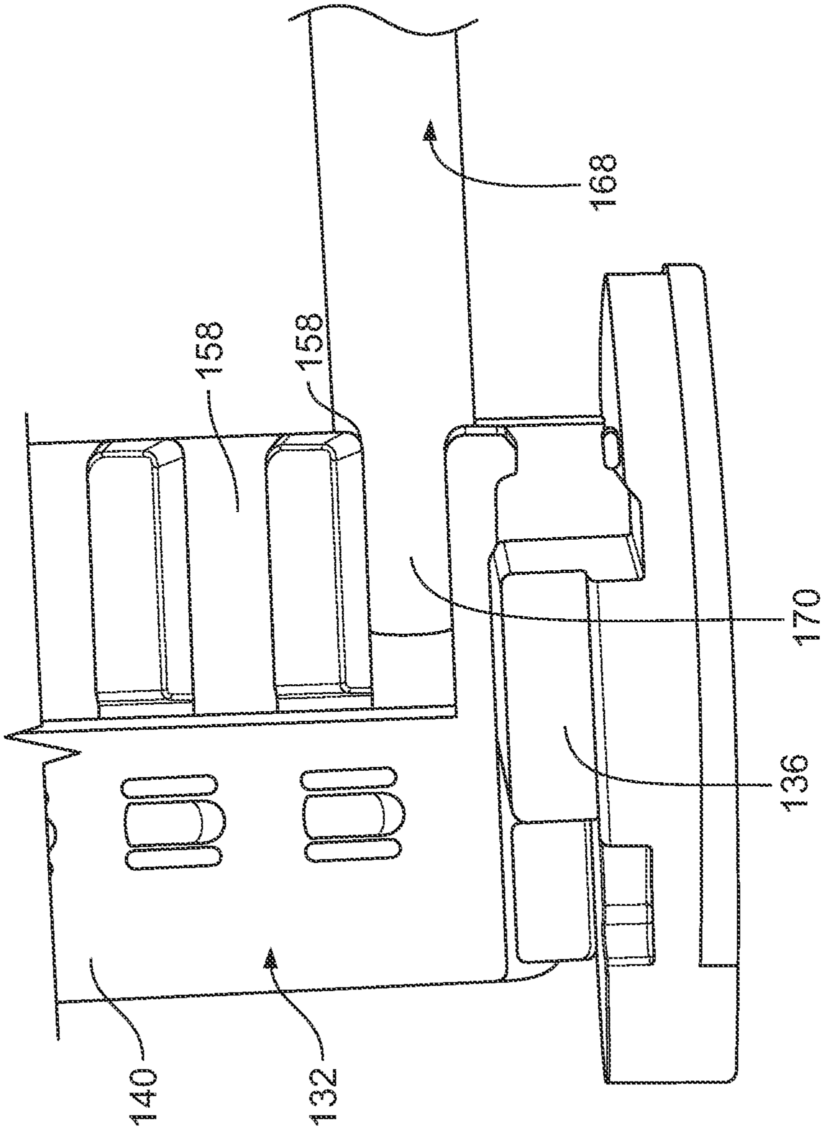
FIG. 9 is a side view of a portion of the lock cylinder plug of FIG. 4 with a key follower recess gauge positioned therein.

FIG. 9 shows a key follower recess gauge 168 inserted into one of the key follower recesses 158. In some examples, the key follower recess gauge 168 is used in at least one of the inspection steps 162, 166. In some examples, the key follower recess gauge 168 can be inserted into each key follower recess 158 consecutively, or a plurality of gauges 168 can be used to simultaneously be inserted in the key follower recesses 158. In some examples, a resistance is measured as the key follower recess gauge 168 is inserted into the key follower recesses 158. In some examples, the key follower recess gauge 168 is inserted into the key follower recesses 158 by way of a machine. In some examples, the key follower recess gauge 168 is inserted into the key follower recesses 158 by way of a human. If the resistance measured, either mechanically, or by feel of the human, is too great, the plug body 132 is rejected as not acceptable. If the measured resistance is acceptable, the plug body 132 is determined to be acceptable and classified as such. In some examples, a portion 170 of the key follower recess gauge 168 that is inserted into the key follower recesses 158 is sized and shaped substantially similar to a key follower. In some examples, the key follower recess gauge 168 can be used in the inspections step 166, either instead of, or in addition to, the inspection step 162.

Figure 11:
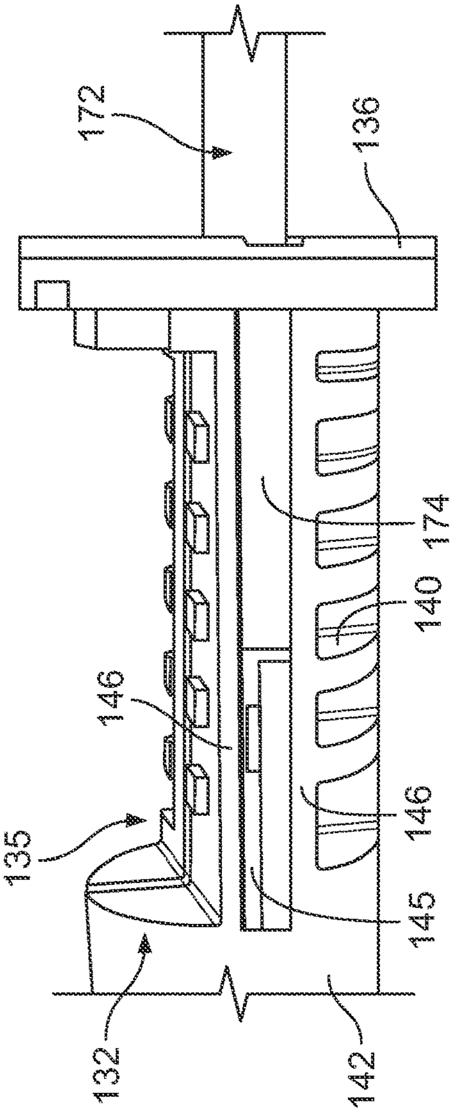
FIG. 11 is a bottom view of a portion of with a keyway gauge of FIG. 10 positioned in a keyway passage of the lock cylinder plug.
Figure 10:
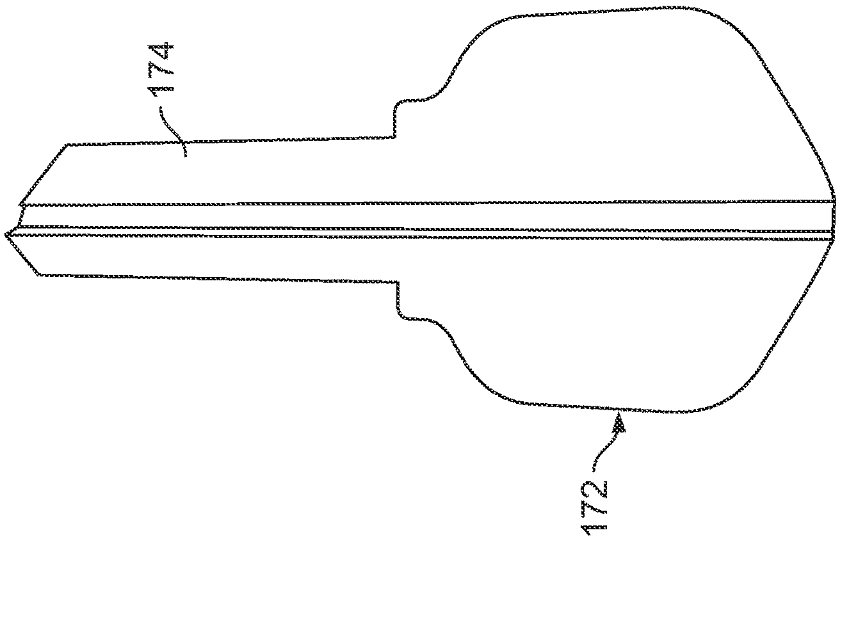
FIG. 10 is side view of a keyway gauge according to an embodiment of this disclosure.

FIG. 10 depicts a keyway gauge 172 that can be used to inspect the keyway 145. In some examples, the keyway gauge 172 is used in at least one of the inspection steps 162, 166. The keyway gauge 172 is sized and shaped substantially similar to a key that is configured to be positioned in the keyway 145 of the plug body 132 when the plug body 132 is used when assembling a complete lock cylinder. The keyway gauge 172 includes a blade 174 that is configured to be positioned within the keyway 145, as shown in FIG. 11. In some examples, walls 146 of the keyway 145 are prone to warping during the sintering step 159 and/or heat treating. To determine if the plug body 132 is acceptable, and if the walls 146 of the keyway are within specification, in some examples, a resistance is measured as the keyway gauge 172 is inserted into the keyway 145. In some examples, the plug body is classified as acceptable if the blade 174 of the keyway gauge 172 is insertable in the entire length of the keyway 145. In some examples, the keyway gauge 172 is inserted into the keyway 145 by way of a machine. In some examples, the keyway gauge 172 is inserted into the keyway 145 by way of a human. If the resistance measured, either mechanically, or by feel of the human, is too great, the plug body 132 is rejected as not acceptable. If the measured resistance is acceptable, the plug body 132 is determined to be acceptable, and classified as such.

In some examples, at least one of the keyway gauge 172 and the key follower recess gauge 168 can be used in the sintering step 159 and/or the heat treatment step 164. In such an example, one or both of the gauges 168, 172, can be positioned with the plug body 132 when heat is applied to the plug body 132. Such a use of the gauges 168, 172 can be similar to the use of the support 167, described above. In some examples, at least one of the keyway gauge 172 and the key follower recess gauge 168 are formed from a material that can withstand the heat applied in both/either the sintering step 159 and the heat treatment step 164. In some examples, at least one of the keyway gauge 172 and the key follower recess gauge 168 are formed from a ceramic material.

During the inspection steps 162, 166 the plug body 132 can also be inspected using other techniques. In some examples, a human can visually inspect the plug body 132 and use a variety of different tools. In some examples, a camera system can be used to automatically classify the plug body 132 as either acceptable or not acceptable. An example inspection system is described in U.S. Pat. No. 8,408,080, which is hereby incorporated by reference in its entirety.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of manufacturing a lock cylinder plug comprising:
- injecting a material into a mold, the material having a metal component and a plastic component, the metal component being at least partially steel;
- molding the material into a lock cylinder plug by way of the mold, the lock cylinder plug having a keyway passage;
- debinding the lock cylinder plug by removing the plastic component from the material forming the lock cylinder plug;
- supporting a portion of the lock cylinder plug using at least one ceramic support before increasing a density of the lock cylinder plug by performing a sintering heating process to the lock cylinder plug;
- inspecting the lock cylinder plug using a keyway gauge, wherein inspecting includes:
  - inserting a keyway portion of the keyway gauge into the keyway passage of the lock cylinder plug; and
  - classifying the lock cylinder plug as acceptable, at least in part, according to whether the keyway portion of the keyway gauge is insertable entirely within the keyway passage of the lock cylinder plug.

2. The method of claim 1, further comprising coining the lock cylinder plug by exerting a force on the lock cylinder plug, and then heat treating the lock cylinder plug.

3. The method of claim 2, further comprising inspecting the lock cylinder plug after coining and prior to heat treating.

4. The method of claim 2, wherein coining is performed after the sintering heating process and before inspecting the lock cylinder plug using the keyway gauge.

5. The method of claim 1, wherein debinding is performed by a debinding heating process, wherein a debinding heat used in the debinding heating process is less than a sintering heat used in the sintering heating process.

6. The method of claim 1, wherein debinding is performed by a debinding chemical process.

7. The method of claim 1, wherein the lock cylinder plug includes a front face and a rear end, wherein the front face includes an opening for the keyway passage, and wherein the at least one ceramic support is positioned between the front face and the rear end when supporting the portion of the lock cylinder plug before increasing the density of the lock cylinder plug.

8. The method of claim 1, wherein the metal component of the lock cylinder plug is steel having a hardness greater than 20 HRC.

9. A lock cylinder plug formed using the method in claim 1, wherein the lock cylinder plug includes:
- a main body extending between a front face and a rear portion;
- a keyway disposed in the front face;
- a plurality of key follower recesses defined in the main body aligned between the front face and the rear portion; and
- a carrier recess defined in the main body, axially adjacent the plurality of key follower recesses, the carrier recess being sized and shaped to receive a carrier therein, wherein the carrier to be received in the carrier recess is movable within, and relative to, the carrier recess.

10. A lock cylinder plug comprising:
- a main body extending between a front face and a rear portion;
- a keyway disposed in the front face; and
- a plurality of key follower recesses defined in the main body aligned between the front face and the rear portion;
- wherein the lock cylinder plug is formed by:
  - injecting a material into a mold, the material having a metal component and a plastic component, the metal component being at least partially steel;
  - molding the material into the lock cylinder plug by way of the mold, the lock cylinder plug having a keyway passage;
  - debinding the lock cylinder plug by removing the plastic component from the material forming the lock cylinder plug;
  - supporting a portion of the lock cylinder plug using at least one ceramic support before increasing a density of the lock cylinder plug by performing a sintering heating process to the lock cylinder plug; and
  - inspecting the lock cylinder plug using a keyway gauge, wherein inspecting includes:

inserting a keyway portion of the keyway gauge into the keyway passage of the lock cylinder plug; and classifying the lock cylinder plug as acceptable, at least in part, according to whether the keyway portion of the keyway gauge is insertable entirely within the keyway passage of the lock cylinder plug.

11. The lock cylinder plug of claim 10, further comprising a carrier recess defined in the main body, axially adjacent the plurality of key follower recesses.

12. The lock cylinder plug of claim 11, wherein the carrier recess includes a carrier having a plurality of key followers positioned therein, and movable relative to, the carrier, wherein each of the plurality of key followers interface with each of the plurality of key follower recesses.

13. The lock cylinder plug of claim 12, wherein the carrier is movable relative to the lock cylinder plug.

14. The lock cylinder plug of claim 10, wherein the lock cylinder plug is positioned within, and rotatable relative to, a cylinder body of a lock cylinder, wherein each of the plurality of key follower recesses includes a key follower spring-loadedly positioned therein.

15. The lock cylinder plug of claim 10, wherein the metal component of the lock cylinder plug is stainless steel.

16. The lock cylinder plug of claim 10, wherein the metal component of the lock cylinder plug is steel having a hardness greater than 20 HRC.

17. A lock cylinder plug comprising:

a main body extending between a front face and a rear portion, the main body having a longitudinal axis extending between the front face and the rear portion;

a keyway disposed in the front face; and a plurality of key follower recesses defined in the main body aligned between the front face and the rear portion, wherein a central axis of each of the plurality of key follower recesses is transverse to the longitudinal axis of the main body;

wherein the main body, the front face, and the rear portion are resistant to drilling and formed from a material having a hardness between 25 HRC and 36 HRC or between 36 HRC and 42 HRC.

18. The lock cylinder plug of claim 17, wherein the main body, the front face, and the rear portion are formed from steel or stainless steel.

19. The lock cylinder plug of claim 17, further comprising a carrier recess defined in the main body, axially adjacent the plurality of key follower recesses, the carrier recess being sized and shaped to receive a carrier therein, wherein the carrier to be received in the carrier recess is movable within, and relative to, the carrier recess.

20. The lock cylinder plug of claim 17, wherein at least one of the main body, the front face, and the rear portion are formed by:

injecting the material into a mold, the material having a metal component and a plastic component, the metal component being at least partially stainless steel;

molding the material into the lock cylinder plug by way of the mold, the lock cylinder plug having a keyway passage;

debinding the lock cylinder plug by removing the plastic component from the material forming the lock cylinder plug;

supporting a portion of the lock cylinder plug using at least one ceramic support before increasing a density of the lock cylinder plug by performing a sintering heating process to the lock cylinder plug; and inspecting the lock cylinder plug using a keyway gauge, wherein inspecting includes:

inserting a keyway portion of the keyway gauge into the keyway passage of the lock cylinder plug; and classifying the lock cylinder plug as acceptable, at least in part, according to whether the keyway portion of the keyway gauge is insertable entirely within the keyway passage of the lock cylinder plug.

* * * * *